United States Patent Office 3,165,530
Patented Jan. 12, 1965

3,165,530
PROCESS FOR PURIFYING TRITHIANE
Klaus Küllmar and Edgar Fischer, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 18, 1961, Ser. No. 124,812
Claims priority, application Germany, July 30, 1960, F 31,804
5 Claims. (Cl. 260—327)

The present invention relates to a process for purifying trithiane.

It is known to prepare trithiane which is the stable cyclic trimer of the unstable monomeric thioformaldehyde, in a simple manner, for example, by the reaction of formaldehyde with hydrogen sulfide in the presence of hydrochloric acid or by the reaction of formaldehyde with sodium thiosulfate in the presence of hydrochloric acid. Crude trithiane which has been prepared according to these processes and which is contaminated by ill-smelling sulfur compounds can be purified as is described in the literature by recrystallization from carbon disulfide, chloroform or benzene.

The recrystallization from the said solvents has, however, the disadvantage that the purification procedure has to be carried out several times, at least 4 to 5 times, in order that an entirely pure and above all an odorless trithiane having a sharp melting point, as is used, for example, for the polymerization of trithiane, be obtained. Such a purification process is complicated and, moreover, undesired losses of substance occur.

Now we have found that the aforesaid disadvantages can be avoided and a pure, entirely odorless trithiane can be obtained without repeated crystallization, by heating crude trithiane which is contaminated by ill-smelling sulfur compounds in solution to a temperature within the range of 100° to 200° C., simultaneously removing the ill-smelling impurities which are present and their splitting products which form during the heating and obtaining the pure trithiane from the solution used by crystallization, the impurities and splitting products being preferably removed by being distilled off, if desired, together with a part of the solvent.

In the process according to the invention, which may be carried out discontinuously or continuously, there may be used as solvents substances having a sufficient capacity of dissolving trithiane at temperatures within the range of 100° to 200° C. By sufficient dissolving capacity is here to be understood the power of the solvents used to yield solutions of at least 2% strength, calculated on the trithiane. In principle, more dilute solutions may be used. However, when such solutions are used the process is in most cases not economical. Besides, the solvents must not react with the trithiane in the above-mentioned temperature range. As substances which have proved suitable as solvents there may be mentioned by way of example hydrocarbons, halogenated hydrocarbons, ethers, esters, nitriles, amines and sulfones.

The boiling point of the solvent used need not be within the range of 100° to 200° C. The purification process according to the invention may, for example, also be carried out in the presence of benzene or another solvent boiling below 100° C. In this case it is, however, necessary to operate under an elevated pressure in order to attain the reaction temperature and to obtain a liquid solution of the trithiane. On the other hand, there may be used solvents boiling at a temperature much above 200° C., for example, benzophenone. The purification may then be carried out under reduced pressure.

If it is desired to use the trithiane for polymerization purposes it is advantageous, though not absolutely necessary, to use solvents which do not possess atoms having solitary pairs of electrons (for example, no compounds containing sulfur, nitrogen or oxygen), since even traces of such compounds may exert an unfavorable influence on an ionic polymerization.

It has also been found that pure, completely odorless trithiane can be obtained with particular advantage by purifying the trithiane by recrystallization from substituted aromatic hydrocarbons boiling between 100° and 200° C., a part of the solvent being separated from the hot solution by distillation before the crystallization of the trithiane. The impurities are expelled together with the solvent and simultaneously unstable oxidation products of trithiane are destroyed and the splitting products are removed together with the solvent distilling over. The desired purification is brought about in one operation.

Solvents which are particularly suitable for use in carrying out the process of the invention are substituted aromatic hydrocarbons boiling within the range of 100° to 200° C., preferably within the range of 120° to 180° C., for example, toluene, ortho-, meta- and para-xylene, ethyl benzene, cumene, monochlorobenzene, ortho- or meta-dichlorobenzene, bromobenzene, anisole and phenetol. Mixtures of these substances may, of course, also be used.

The quantity of solvent which has to be distilled off before the crystallization of the trithiane in order that the desired degree of purification be obtained depends on the purity of the crude trithiane and on the boiling temperature of the solvent. When solvents boiling at a higher temperature are used it suffices to distill off a smaller quantity of solvent whereas when solvents boiling at a lower temperature are used larger quantities of solvent have to be distilled off. In general, 2 to 20 times the quantity by weight of solvent, calculated on the quantity by weight of the substance to be purified, is distilled off.

The total quantity of solvent may be such from the beginning that after the desired portion has been distilled off the trithiane used just remains in the hot solution. Alternatively, a hot saturated solution of trithiane may first be prepared and further quantities of solvent may be added at the same rate as solvent is removed from the solution by distillation.

The trithiane which after the termination of the crystallization has crystallized out from the cooled solution is filtered off, washed several times with the same and/or another one of the above-mentioned solvents and dried, preferably under reduced pressure, at a temperature within the range of 60° to 80° C. Very pure trithiane is obtained which has a sharp melting point at 217° C. The trithiane is obtained in very good yields amounting to at least 90 to 95%, calculated on the crude product used as starting material.

The mother liquors and the solvent which has been distilled off may be purified by a known process and be used again.

The following examples serve to illustrate the invention but they are not intended to limit it thereto, the parts being by weight.

*Example 1*

180 parts of crude trithiane were dissolved in 2800 parts of toluene. From the resulting solution 1600 parts of toluene were distilled off. The trithiane crystallizing out from the cooled solution in the form of white needles was filtered off with suction and washed three times with 80 parts of cold toluene each time. After drying at 60° C. under reduced pressure a pure, odorless trithiane melting at 217° C. was obtained.

*Example 2*

100 parts of crude trithiane were dissolved in 1500 parts of monochlorobenzene and from the resulting solution 500 parts of monochlorobenzene were distilled off.

The trithiane crystallizing out after the cooling of the solution was filtered off with suction and washed three times with 100 parts of cold chlorobenzene each time. After drying at 80° C. under reduced pressure a pure, odorless trithiane melting at 217° C. was obtained.

*Example 3*

100 parts of crude trithiane were dissolved in 800 parts of cumene. From the resulting solution 350 parts of solvent were distilled off while simultaneously 350 parts of fresh cumene were added at the same rate at which cumene was distilled off. After the solution had grown cold the trithiane which had crystallized out was filtered off with suction and washed twice with cold cumene and subsequently twice with benzene. The pure trithiane which was obtained after drying at 70° C. under reduced pressure was odorless and melted at 217° C.

*Example 4*

100 parts of crude trithiane were dissolved in 1500 parts of anisole. From the resulting solution 600 parts of anisole were distilled off. The trithiane which crystallized out after the cooling of the solution was filtered off with suction, washed three times with cold anisole and dried in vacuo at 80° C. White, odorless crystals were obtained which melted at 217° C.

*Example 5*

100 parts of crude trithiane were dissolved in 1200 parts of o-dichlorobenzene. From the resulting solution 200 parts of o-dichlorobenzene were distilled off. The trithiane which crystallized out after the solution had grown cold was filtered off with suction, washed twice with dichlorobenzene and subsequently once with benzene and then dried in vacuo at 70° C. The pure, odorless trithiane which was obtained melted at 217° C.

We claim:

1. A process for purifying crude 1,3,5-trithiane contaminated by ill-smelling sulfur compounds which comprises dissolving the crude 1,3,5-trithiane in an inert solvent, heating the trithiane solution to a reflux temperature within the range of 100 to 200° C. for distilling off part of the solvent with the ill-smelling sulfur compounds and their decomposition products, and recrystallizing pure trithiane from the solution.

2. A process as defined in claim 1 wherein the inert solvent has a boiling point between 100 and 200° C. at atmospheric pressure.

3. A process as defined in claim 1 wherein the inert solvent is an aromatic hydrocarbon having a boiling point between 120 and 180° C. at atmospheric pressure.

4. A process as defined in claim 1 wherein the solvent is a member selected from the group consisting of lower alkyl benzenes, chloro benzenes, lower alkyl phenyl ethers, benzene, benzophenone and mixtures thereof.

5. A process as claimed in claim 1 wherein the quantity by weight of the solvent which is distilled off is two to twenty times the quantity by weight of the crude trithiane used as starting material.

References Cited in the file of this patent

Blatt: Organic Syntheses, Collective Vol. II, 1943, pp. 610–611.

Handbook of Chemistry and Physics, 34th ed., Chem. Rubber Pub. Company, Cleveland, Ohio (1952), pp. 904, 905 and 1170.

The Ring Index, Amer. Chem. Soc., 2nd ed. (1960), pp. 29 and 1410.